United States Patent
Lee et al.

(10) Patent No.: US 8,725,221 B2
(45) Date of Patent: May 13, 2014

(54) PORTABLE TERMINAL HAVING PROJECTION FUNCTION

(75) Inventors: Joo-Ho Lee, Seoul (KR); Hyun-Suk Yang, Gyeonggi-Do (KR); Bong-Kuk Hong, Gyeonggi-Do (KR); Deok-Yong Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/649,211

(22) Filed: Dec. 29, 2009

(65) Prior Publication Data

US 2010/0197354 A1  Aug. 5, 2010

(30) Foreign Application Priority Data

Jan. 30, 2009 (KR) .................. 10-2009-0007223

(51) Int. Cl.
*H04W 88/02*  (2009.01)
(52) U.S. Cl.
USPC .................. 455/575.1; 455/575.3; 455/575.4
(58) Field of Classification Search
USPC .......... 455/550.1, 572.2, 575.1, 575.3, 575.4; 345/3.1
See application file for complete search history.

(56) References Cited

U.S. PATENT DOCUMENTS

| | | | |
|---|---|---|---|
| 7,862,185 B2 * | 1/2011 | Noba | 353/119 |
| 2002/0068614 A1 | 6/2002 | Karidid et al. | |
| 2002/0180694 A1 | 12/2002 | Isaacson | |
| 2009/0033880 A1 * | 2/2009 | Heo et al. | 353/52 |

FOREIGN PATENT DOCUMENTS

| | | |
|---|---|---|
| CN | 1182998 A | 5/1998 |
| CN | 101287020 A | 10/2008 |
| EP | 0817393 A2 | 1/1998 |
| JP | 8147071 A | 6/1996 |
| WO | WO 2004/023208 A1 | 3/2004 |

* cited by examiner

*Primary Examiner* — Ajit Patel
*Assistant Examiner* — Julio Perez
(74) *Attorney, Agent, or Firm* — Birch, Stewart, Kolasch & Birch, LLP

(57) ABSTRACT

A portable terminal is provided and the portable terminal includes a terminal body, a projector operatively connected to the terminal body, and a door movably mounted to the terminal body, the door being moveable between a first position covering the projector and a second position exposing the projector.

32 Claims, 15 Drawing Sheets

PORTABLE TERMINAL HAVING PROJECTION FUNCTION

CROSS-REFERENCE TO RELATED APPLICATIONS

Pursuant to 35 U.S.C. §119(a), this application claims the benefit of Korean Application No. 10-2009-0007223, filed on Jan. 30, 2009, the contents of which is hereby incorporated by reference herein in its entirety.

BACKGROUND OF THE INVENTION

1. Field of the Invention

The present invention relates to a portable terminal having a projecting function capable of outputting images, independent of a display.

2. Description of Related Art

A portable terminal is a device that can be easily carried and have one or more functions such as supporting voice calls and telephony calls, inputting and/or outputting information, storing data, and the like.

As the portable terminal has become multifunctional, the portable terminal has been designed to capture still images or moving images, play music or video files, play games, receive broadcast and the like, so as to be implemented as an integrated multimedia player (device). Various approaches using hardware and/or software have used to provide multimedia devices implementing such complicated functions. For example, a user interface environment is provided in order for users to easily and conveniently retrieve or select functions.

BRIEF SUMMARY OF THE INVENTION

According to principles of the present invention, a portable terminal has been provided that includes a projecting function capable of outputting images in a different configuration from the related art.

In another aspect, a portable terminal is provided that allows a projecting unit to be selectively exposed outwardly.

In yet another aspect, a portable terminal is provided that improves a heat dissipation capability of a projecting unit during projection.

To achieve these and other advantages and in accordance with the purpose of the present invention, a portable terminal having a projecting function in accordance with one embodiment may be provided, the portable terminal including a terminal body, a projector operatively connected to the terminal body, and a door movably mounted to the terminal body, the door being moveable between a first position covering the projector and a second position exposing the projector.

In accordance with another aspect of the present invention, a kit for a portable terminal having a projecting function may be provided, the kit including a portable terminal having a terminal body and a battery cover mountable to the terminal body to cover a battery compartment; and a projection unit detachably mountable to the terminal body in place of the battery cover, the projecting unit including a projector configured to output visible information, a housing configured to support the projector such that the projector is moveable between a first state and a second state, the housing being detachably coupled to the terminal body, and a door mounted to the housing, the door being moveable between a first position covering the projector and a second position exposing the projector.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 8b illustrates a schematic view of a cooperation unit in accordance with one variation of the cooperation unit shown in FIG. 8a;

FIG. 15b illustrates a schematic view of the portable terminal at one step of the flowchart of FIG. 15a;

FIG. 16b illustrates a schematic view showing the portable terminal whose display outputs one step of the flowchart of FIG. 16a;

FIG. 17b illustrates a schematic view of an operation state according to a variation of FIG. 17a.

DETAILED DESCRIPTION OF THE INVENTION

Figure 1:
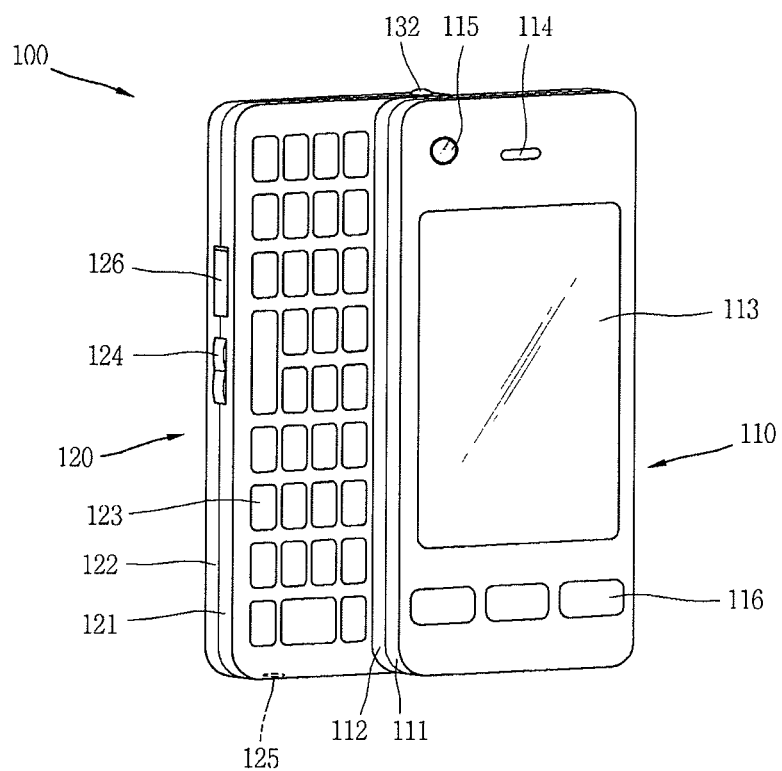
FIG. 1 illustrates a perspective view of a portable terminal in accordance with one embodiment of the present invention.

Description will now be given in detail of a portable terminal according to the present invention, with reference to the accompanying drawings. In this specification, the same or similar reference numerals are given to the same or similar components even in different embodiments, and additional description thereof will be omitted unless necessary to the understanding of the invention.

As shown in FIG. 1, a portable terminal 100 may include a terminal body having a first body 110 and a second body 120 slidably connected to the first body 110 in at least one direction. The sliding direction may be a widthwise direction of the first and second bodies 110 and 120. While the present invention is described with reference to a slide type portable terminal, the present invention is not limited to this configuration, but rather is applicable to various types of portable terminals, such as bar type, folder type, swing type, swivel type, and the like.

Figure 3:
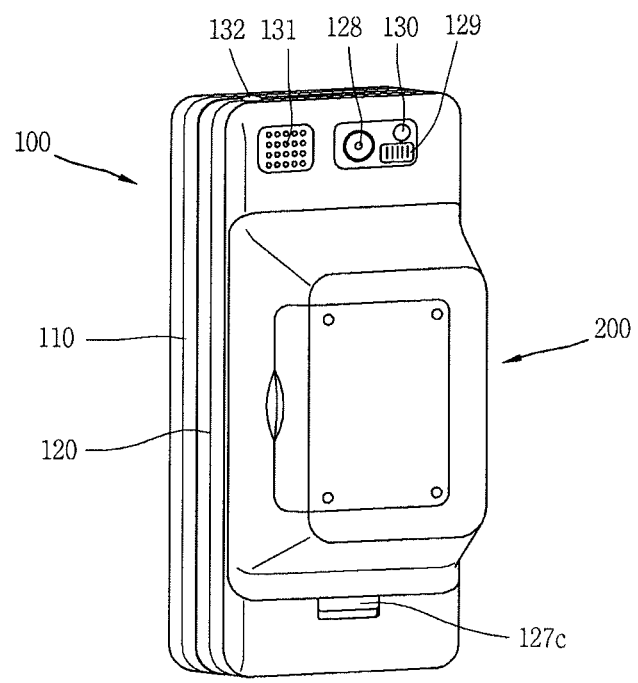
FIG. 3 illustrates a perspective view of a projecting unit being mounted to the portable terminal of FIG. 1.

The state where the first body 110 is positioned over the second body 120 may be referred to as a closed configuration (position) (see FIG. 3). Also, the state where the first body 110 exposes at least part of the second body 120 can be referred to as an open configuration (position).

In addition, the portable terminal may be operable in a standby (idle) mode when in the closed configuration, but this mode can be released by a user's manipulation. Also, the portable terminal may be operable in an active (phone call) mode in the open configuration. This mode may also be changed into the idle mode according to the user's manipulation or after a certain time elapses.

A case (housing, casing, cover, etc.) forming the outside of the first body 110 is formed by a front case 111 and a rear case 112. In addition, various electronic components may be disposed in a space between the front case 111 and the rear case 112. At least one intermediate case may additionally be disposed between the front case 111 and the rear case 112. Further, the cases can be formed of resin in a manner of injection molding, or formed using metallic materials such as stainless steel (STS) and titanium (Ti).

A display 113, an audio output unit 114, a first video or image input unit 115, and a first manipulation unit 116 may be disposed on the first body 110, for example, on the front case 111.

The display 113 may be configured to display visible information, examples of which include a liquid crystal display (LCD) module, an organic light emitting diodes (OLED) module, a transparent OLED (TOLED) and the like. The display 113 may further include a touch sensor so as to allow a user to perform a touch input. The display 113 may be configured to generate various tactile effects which a user can feel upon a touch input. Such function can be implemented by employing a haptic module cooperating with the display 113. The haptic module can generate tactile effects, such as a vibration. Such haptic module may be disposed differently depending on the configuration of the portable terminal 100 as well as the configuration of the display 113.

The audio output unit 114 may be configured as a receiver or a speaker. The first image input unit 115 may be a camera module for allowing a user to capture images or video. The first manipulation unit 116 may receive a command input to control the operation of the portable terminal 100.

Similar to the first body 110, the second body 120 may include a front case 121 and a rear case 122. A second manipulation unit 123 may be disposed at a front surface of the front case 121. A third manipulation unit 124, a first audio input unit 125 and an interface 126 may be disposed on at least one of the front case 121 or the rear case 122.

The first to third manipulation unit can be referred to as a user input unit, which can be manipulated in any tactile manner that allows a user to make a touch input. For example, the user input unit can be implemented as a dome switch, a touch screen or touchpad which can receive information or commands input by a user in a pushing or touching manner, or implemented in a manner of using a wheel, a jog or a joystick to rotate keys.

Regarding the function of each manipulation unit, the first manipulation unit 116 can be used for inputting commands such as START, END, SCROLL or the like, the second manipulation unit 123 can be used for inputting numbers, characters, symbols, or the like, and the third manipulation unit 124 can function as a hot key for activating a specific function, such as activation of the first image input unit 115. It is understood that the particular functions of the manipulation unit need not be assigned as specifically described above, and the manipulation units are not limited to just these identified inputs.

If the display 113 is configured to be touch-sensitive, the display 113 can also act as an additional manipulation unit of the user input unit. When the display 113 is configured to be touch-sensitive so as to allow various types of input, the second manipulation unit 123 may have keys having dome switches, which allow different types of input from a touch-sensitive input. Such keys may be arranged in a lengthwise direction of the front case 121, and can be formed in a QWERTY configuration. In this case, the second manipulation unit 123 allows preset (patterned) inputs, compared to a touch input, to allow a user to process such inputs more quickly. Also, when a user performs the input in the manner of using the dome switches, the user can feel the difference from using a touch input. As a result, the input using the dome switches and the touch input can complement each other.

The first audio input unit 125 may be configured as a microphone so as to receive user's voice, other sounds and the like.

The interface 126 may connect the portable terminal 100 and external devices so as to allow data exchange therebetween or the like. For example, the interface 126 may be at least one of a wired/wireless access terminal for earphones, a short-range communication port (e.g., IrDA port, BLUETOOTH port, wireless LAN port, and the like), and power supply terminals for supplying power to the portable terminal.

The interface 126 may be a card socket for accommodating an external card such as Subscriber Identification Module (SIM), User Identity Module (UIM), memory card for storing information, or the like.

Figure 2:
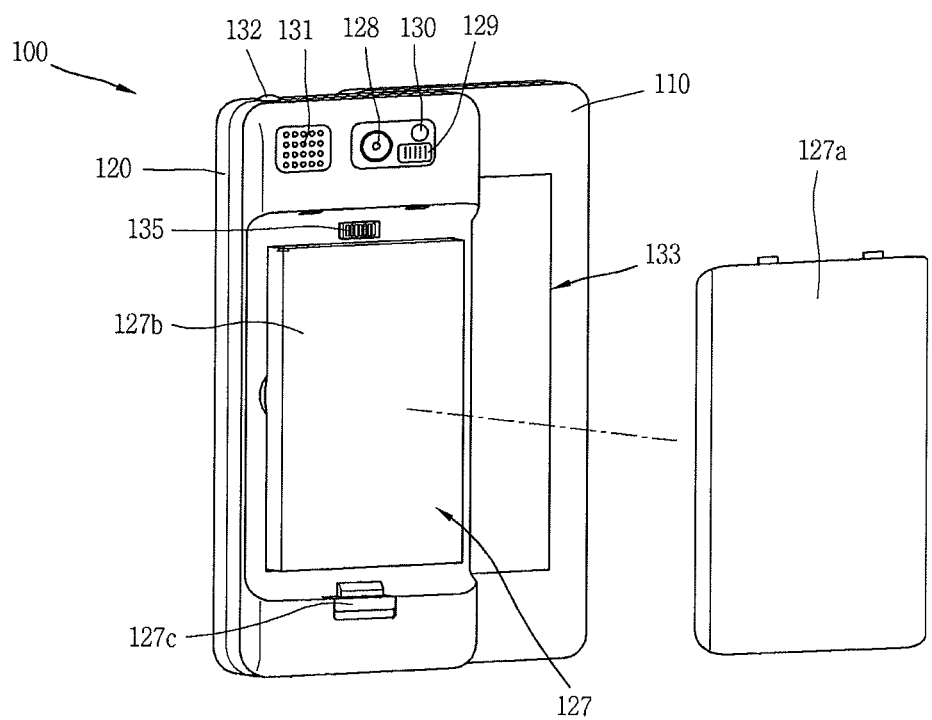
FIG. 2 illustrates a partially exploded view of a rear surface of the portable terminal of FIG. 1.

As shown in FIG. 2, a power supply 127 for supplying power to the portable terminal 100 may be disposed at the rear case 122. The power supply 127 may be a rechargeable battery, which is attachable or detachable for charging. The power supply 127 may include a battery cover 127a, a battery 127b and a coupling portion 127c. The battery 127b is accommodated in a recess portion (an accommodation chamber) of the rear case 122, and covered by the battery cover 127a. The battery cover 127a is detachably engaged with the coupling portion 127c to be coupled to the rear case 122. A projector terminal 135 may be formed at a region that is exposed when the battery cover 127a is removed.

A second image input unit 128 may further be disposed on the rear case 122 of the second body 120. The second image input unit 128 faces a direction which is substantially opposite to a direction faced by the first image input unit 115 (see FIG. 1). Also, the second image input unit 128 may be a camera having different pixels from those of the first image input unit 115. For instance, the first image input unit 115 may operate with relatively lower pixels (lower resolution). Thus, the first image input unit 115 may be useful when a user can capture his face and send it to another party during a video call or the like. On the other hand, the second image input unit 128 may operate with relatively higher pixels (higher resolution) such that it can be useful for a user to obtain higher quality pictures for later use.

A flash 129 and a mirror 130 may be disposed adjacent to the second image input unit 128. The flash 129 operates in conjunction with the second image input unit 128 when taking a picture using the second image input unit 128. The mirror 130 can cooperate with the second image input unit 128 to allow a user to photograph himself in a self-portrait mode.

A second audio output unit 131 may further be disposed at the rear case 122. The second audio output unit 131 can cooperate with the first audio output unit 114 (see FIG. 1) to provide stereo output. Also, the second audio output unit 131 may be configured to operate as a speakerphone.

At one side of the rear case 122 may be disposed a broadcast signal receiving antenna 132, as well as an antenna for call communications or the like. The antenna 132 may retract into the second body 120.

A part of a slide module 133 for slidably coupling the first body 110 to the second body 120 may be disposed at the rear case 112 of the first body 110. Another part of the slide module 133 may be disposed at the front case 121 of the second body 120, so as not to be exposed to the exterior as shown in FIG. 2.

While the portable terminal has been described as having the second image input unit 128 disposed at the second body 120, the present invention is not so limited to this configuration. It is also possible that one or more of those components (e.g., 128 to 132), which have been described to be implemented on the rear case 122, such as the second image input unit 128, can be implemented on the first body 110, particularly, on the rear case 112. In this configuration, the component(s) disposed on the rear case 112 can be protected by the second body 120 in a closed state of the portable terminal. In addition, if the second image input unit 128 is eliminated, the first image input unit 115 can be implemented to be rotatable so as to rotate up to a direction which the second image input unit 128 faces.

As shown in FIG. 3, a projecting unit 200 is detachably mounted to the rear case 122, specifically, coupled to the coupling portion 127c when the battery cover 127a is removed. The projecting unit 200 may be attached to or detached from the coupling portion 127c in the same manner that the battery cover 127a is attached to or detached from the coupling portion 127c. By employing the coupling portion 127c for the assembly of the projecting unit 200, any other component for the assembly of the projecting unit 200 is not required. The projecting unit 200 is electrically connected to the projector terminal 135 exposed outwardly upon the battery cover 127a being separated (see FIG. 2).

The projecting unit 200 may be protruded from a central portion of the rear case 122. In this arrangement, the second audio output unit 131 and the second image input unit 128 may be disposed on the rear case 122 at a region that is not occupied by the projecting unit 200.

Figure 4A:
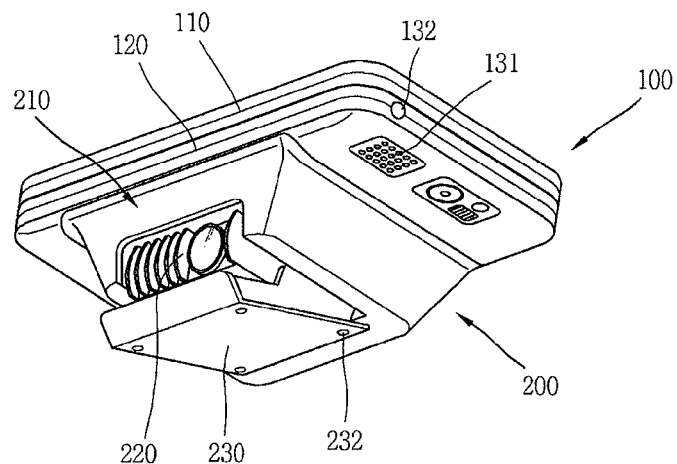
FIG. 4a illustrates a perspective view showing an open state of a door of the projecting unit shown in FIG. 3.

As shown in FIG. 4a, the projecting unit 200 may include a housing 210, a projector 220 and a door 230. The housing 210 is a portion assembled to the rear case 122 and accommodates the projector 220 therein. The projector 220 may be configured to output images or video on another object, e.g., wall or furniture. The door 230 is coupled to the housing 210 such that the projector 220 is not outwardly exposed in its closed state, as shown in FIG. 3, and outwardly exposed in an open state of the door 230, as shown in FIG. 4a. The door 230 may be implemented to be kept in the open state. In this exemplary embodiment, the projector 220 may be operated in the exposed state even without a user's manipulation. The door 230 may be changed between an open state and a closed state by rotating about a rotational shaft disposed along its one edge. Alternatively, the door 230 may be movable by the combination of rotation and sliding.

In addition to the door 230 being rotatable, the projector 220 may also be rotatably coupled to the housing 210. In this case, the rotational shafts of the projector 220 and the door 230 may be the same or configured in parallel.

In the open state of the door 230, a gap G is preferably preset between the door 230 and the projector 220. Accordingly, air flowing via the gap G can dissipate heat generated in the projector 220. For instance, if the projector 220 and the door 230 were in parallel to each other in the closed state, in order to ensure the gap G, a rotation angle of the door 230 can be made to be greater than that of the projector 220. According to the formation of the gap G, part or all of the projector 220 may be spaced apart from the door 230 farther in the open state than the projector 220 being accommodated in the housing 210 in the closed state. As a result, a portion where a lens of the projector 220 is disposed may be spaced apart farther from the door 230.

Anti vibration members 232 may be formed at an outer surface of the door 230. Each of the anti vibration members 232 may be integrally formed with the door 230 in the form of protrusion protruded from the outer surface of the door 230, or be a pad formed of a material selected for adsorbing vibration.

Figure 4B:
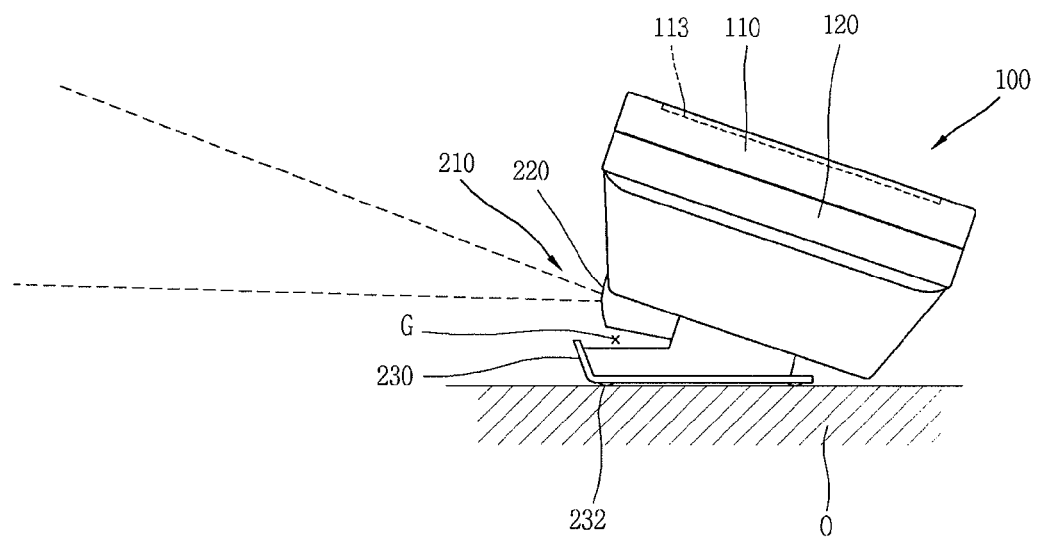
FIG. 4b illustrates a side view showing the projecting unit of FIG. 4a being positioned on an object.

Referring to FIG. 4b, the door 230 is disposed to have a surface intersecting a surface of the display 113. Accordingly, the main surface of the door 230 may be placed on a main surface of an object O, such as a table, on which the portable terminal 100 is positioned, and the display 113 may be inclined towards a user. The user may face the portable terminal 100 in an opposite direction to an image being projected from the projector 220. The main surface of the door 230 is maintained slightly spaced apart from the main surface of the object O by the anti vibration members 232. The anti vibration members 232 may adsorb or alleviate vibration when being generated in the portable terminal 100.

The second audio output unit 131 disposed outside of the region where the projector 220 is installed is spaced apart from the main surface of the object O when the projecting unit 200 is in an open configuration. As a result, sounds can be outputted without any interference with the object O.

Figure 5:
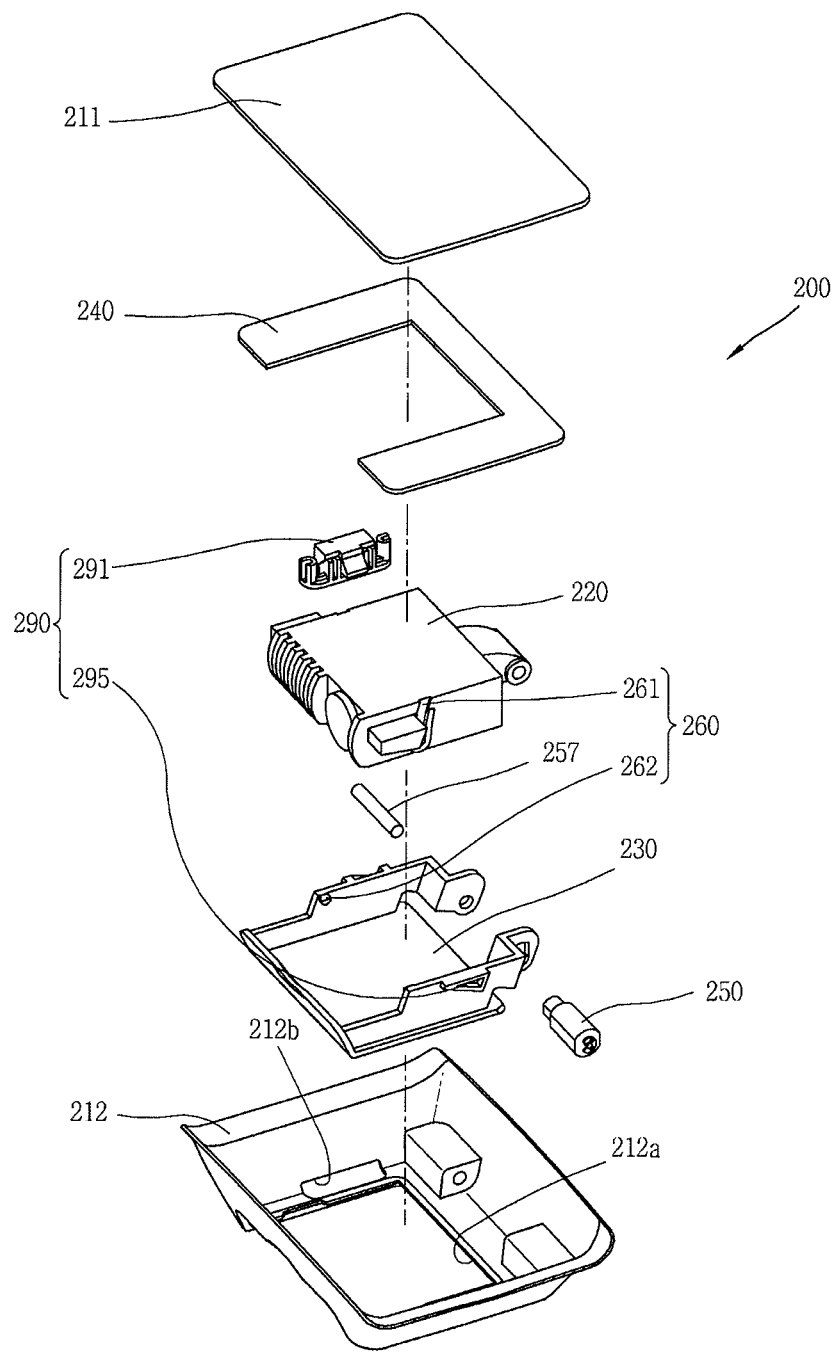
FIG. 5 illustrates an exploded view of the projecting unit of FIG. 3.

As shown in FIG. 5, the housing 210 may include an installation cover 211 and an accommodation cover 212. The installation cover 211 is coupled to the coupling portion 127c (see FIG. 3) of the rear case 122. The accommodation cover 212 has a preset space in which the projector 220 is disposed. The accommodation cover 212 has an opening 212a in which the door 230 is aligned. A circuit board 240 for controlling the projector 220 may be disposed between the installation cover 211 and the accommodation cover 212. The circuit board 240 is electrically connected to a projector terminal 135 which is exposed via the rear case 122, such that the projector 220 can be controlled by a controller 170 (see FIG. 14) of the portable terminal 100.

A cam unit 250, also referred to as a maintenance unit, may be employed to rotatably couple the accommodation cover 212 and the door 230. The cam unit 250 allows the rotatable coupling therebetween and maintains the open state of the door 230, which will be described with reference to FIGS. 6 and 7.

Still referring to FIG. 5, the accommodation cover 212 may have another opening 212b, in addition to the opening 212a. A locking unit 290 for locking the door 230 in a closed state with respect to the accommodation cover 212 is partially exposed outwardly through the opening 212b. Alternatively, in addition to the maintenance unit, the locking unit 290 may perform locking to maintain the open state of the door 230 with respect to the accommodation cover 212.

A knob-latch assembly 291 defining the locking unit 290 is configured to be partially exposed through the opening 212b. The knob-latch assembly 291 can perform locking by interacting with a supporting portion 295 (see also FIG. 11) formed at a side surface of the door 230.

Figure 6:
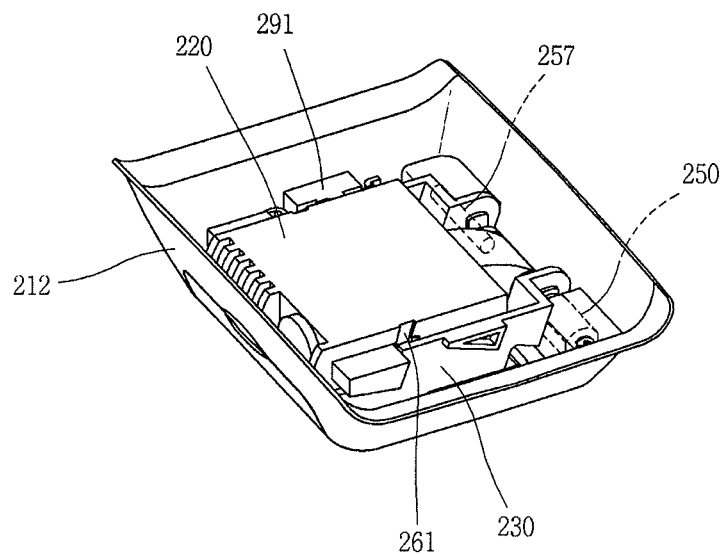
FIG. 6 illustrates a perspective view seen from the inside to the outside in a state of the projecting unit of FIG. 5 being mounted.

As shown in FIG. 6, part of the cam unit 250 is inserted in the accommodation cover 212 and another part thereof is inserted in the door 230. The cam unit 250 includes a rotational shaft of the door 230. Another cam unit may be installed at an opposite portion to the part of the door 230 coupled to the cam unit 250. If a pair of cam units are provided, the pair of cam units will increase a force for maintaining an open state (or a closed state) of the door 230. When just a single cam unit 250 is provided, the door 230 and the accommodation cover 212 may be coupled to each other by a shaft 257m as shown in FIG. 6. When the shaft 257 is configured to be inserted into a portion of the projector 220 as well as into another portion of the door 230, the rotational axis of the projector 220 may be the same as the rotational axis of the door 230. The projector 220 may perform a relative rotation with respect to the accommodation cover 212 by the shaft 257. Alternatively, the projector 220 may be moved in parallel to the accommodation cover 212 along a sliding rail. In this case, the projector 220 may be moved in parallel in a thickness direction of the main body of the portable terminal 100.

The rotation of the door 230 can cooperate with the rotation of the projector 220 by a cooperation unit 260. In particular, when the door 230 covering the projector 220 rotates to be in an open state, the projector 220 cooperates with the door 230 such that it can rotate to be in a second state having a different projection direction from that in a first state of being accommodated in the accommodation cover 212. As one example of the cooperation unit 260, a guide portion 261 may be formed at a side surface of the projector 220 (i.e., a surface of the projector 220 facing the side surface of the door 230). The guide portion 261 slidably accommodates a protrusion 262 (see FIG. 5) inwardly protruded from the side surface of the door 230. To this end, the guide portion 261 may be formed as the side surface of the projector 220 is recessed in a curved shape. Alternatively, the guide portion 261 may be configured such that one portion of the side surface of the projector 220 is protruded to be engaged with the protrusion 262.

As the protrusion 262 of the door 230 is engaged with one end of the guide portion 261, the projector 220 rotates in cooperation with the door 230. A gap between the door 230 and the projector 220 is defined according to the location of the one end of the guide portion 261. If the projector 220 rotates in a direction that the door 230 rotates to be open by gravity, the protrusion 262 is stacked (locked) at the opposite end of the guide portion 261 such that its further rotation is prevented. The gap between the door 230 and the projector 220 may be flexibly set based on the configuration of the protrusion 262 and the guide portion 261.

The knob-latch assembly 291 is provided as the locking unit 290 in the drawing. The knob-latch assembly 291 is disposed adjacent to the door 230 of the accommodation cover 212, and interacts with a supporting portion 295 (see FIG. 11) installed at the door 230, thereby locking the door 230 in its open state or its closed state, which will be described in more detail with reference to FIG. 11.

Figure 7:
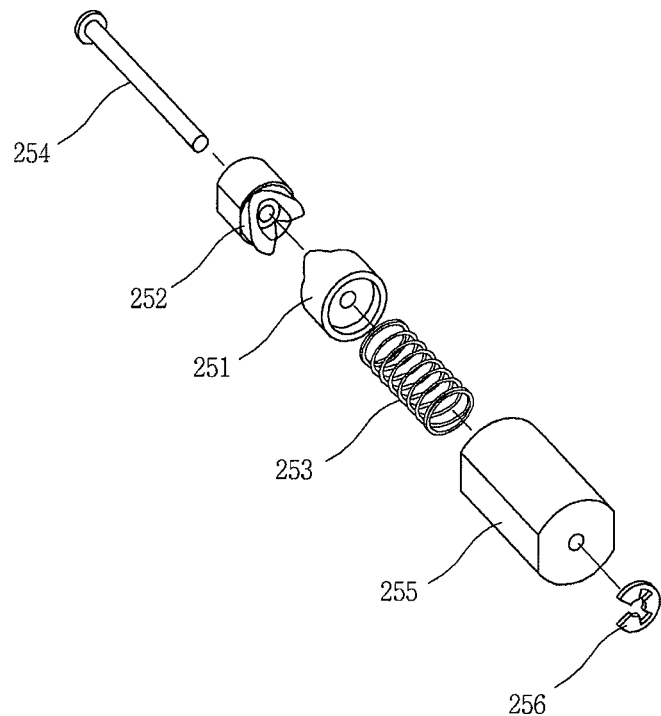
FIG. 7 illustrates a disassembled view of a cam unit shown in FIG. 6.

As shown in FIG. 7, the cam unit 250 may include a fixed portion 251 and a movable portion 252 engaged with each other. Uneven patterns are formed on the engaged surfaces between the fixed portion 251 and the movable portion 252. The fixed portion 251 and the movable portion 252 are aligned by a supporting shaft 254 inserted through the fixed and movable portions 251 and 252, and elastically press-fitted to each other by an elastic member 253 inserted in an accommodation member 255. One end portion of the supporting shaft 254 is inserted through the accommodation body 255 to be coupled thereto by a coupling member, such as a clip 256, thereby being prevented from being separated.

The fixed portion 251 and the elastic member 253 are inserted into the accommodation cover 212 in the accommodation member 255 to be fixed thereto. The movable portion 252 is inserted into the door 230 so as to relatively rotate with respect to the fixed portion 251 in cooperation with the rotation of the door 230.

During the rotation between the fixed portion 251 and the movable portion 252, if the protruded (uneven) patterns of each of them are contacted, the fixed portion 251 and the movable portion 252 move away from each other. Such movement is performed in an axial direction of the supporting shaft 254. If a convex pattern of one of the fixed portion 251 and movable portion 252 is engaged with a concave pattern of another one of them, the fixed portion 251 and the movable portion 252 move closer to each other. Such engaged state of the protruded patterns is more stably provided by the support by means of the elastic member 253 than the protruded patterns being merely contacted, so the accommodated state is maintained. Under this state, the door 230 can stably be maintained in its open state or its closed state.

A maintenance unit for maintaining the open state of the door 230 may be configured in a different form from the cam unit 250. For instance, in one exemplary embodiment, a groove may be formed in the door 230 such that the housing 210 is inserted in the groove and a protrusion elastically supported by an elastic member is formed. In this embodiment, in the open or closed state of the door 230, the protrusion is elastically inserted in the groove to allow the maintenance of the open or closed state. Hence, it can be understood that the maintenance unit includes first and second members engaged with each other, and an elastic member for pressing the two members closely such that the engaged state can elastically be maintained.

Figure 8A:
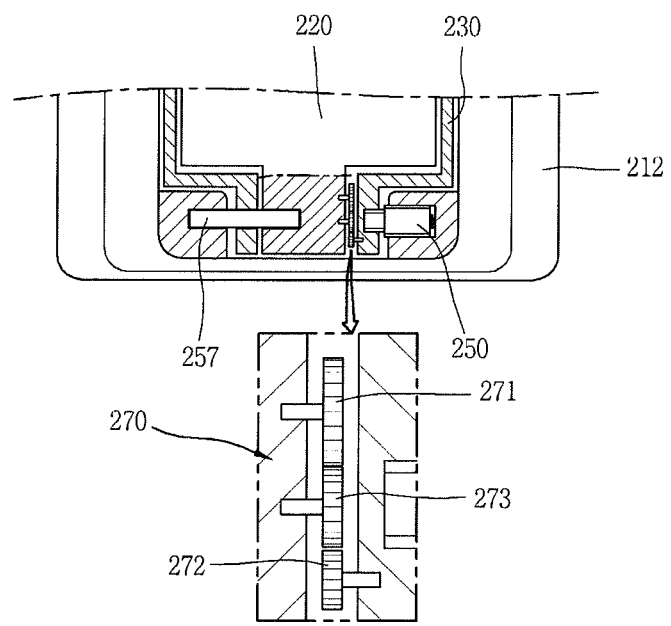
FIG. 8a illustrates a schematic view of a cooperation unit in accordance with one variation of a cooperation unit shown in FIG. 6.

As shown in FIG. 8a, as shown in the previous embodiment, part of the door 230 is coupled to the accommodation cover 212 by the cam unit 250. Another part of the door 230 and the projector 220 are rotatably coupled to the accommodation cover 212 by the shaft 257. A plurality of gears forming the cooperation unit 270 are disposed at one part of the door 230 and one part of the projector 220 facing the one part of the door 230. Three circumscribed gears 271 to 273 may be disposed as the cooperation unit 270. One of the gears 271 to 273 may be installed at the door 230 and the other two gears are installed at the projector 220. The gears 271 to 273 are disposed to be sequentially engaged with an adjacent gear. The middle gear 273 is configured to prevent the door 230 and the projector 220 from rotating in different directions when the two gears 271 and 272 are directly engaged with each other, resulting in matching of the rotation directions. At least one pair of the gears 271 to 273 engaged with each other may have different diameters. If the diameter of the gear 271 is longer than that of the gear 272, the door 230 may have a rotation angle greater than that of the projector 220.

Figure 8B:
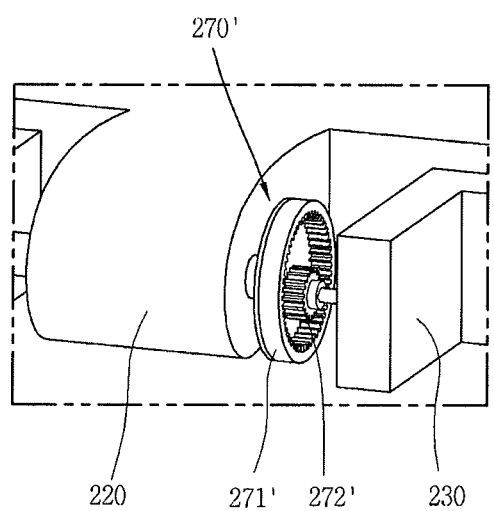

In accordance with another exemplary embodiment, as shown in FIG. 8b, a gear 271' installed at the projector 220 is an inscribed gear having gear teeth formed at an inner circumferential surface of an annular body. A gear 272' installed at the door 230 has gear teeth formed at an outer circumferential surface, and is engaged with the gear 271' in a cavity defined by the gear 271'. With such a configuration, the gears 271' and 272' rotate in the same direction without any additional member, which indicates that the rotation of the door 230 is transferred to the gear 271' via the gear 272' such that the projector 220 can rotate in the same direction as the door 230.

Figure 9:
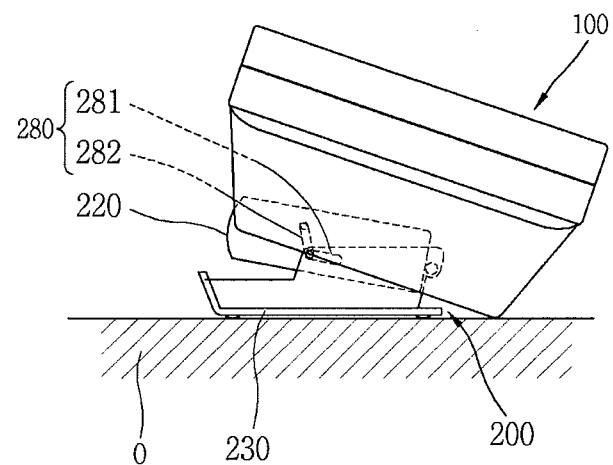
FIG. 9 illustrates a schematic view of a cooperation unit in accordance with another variation of the cooperation unit shown in FIG. 6.

As shown in FIG. 9, in accordance with another exemplary embodiment, the cooperation unit 280 may include a slot 281 formed in the projector 220 and a link 282 having one end portion provided on the door 230. The other end portion of the link 282 may be slidably inserted into the slot 281 such that the door 230 is rotatable with respect to the projector 220. Upon the door 230 being rotated, the end portion of the link 282 slides until it is stopped at one end of the slot 281, and then guides the projector 220 in the same rotational direction of the door 230. Alternatively, the slot 281 and the link 282 may be formed in the door 230 and provided on the projector 220, respectively.

Figure 10:
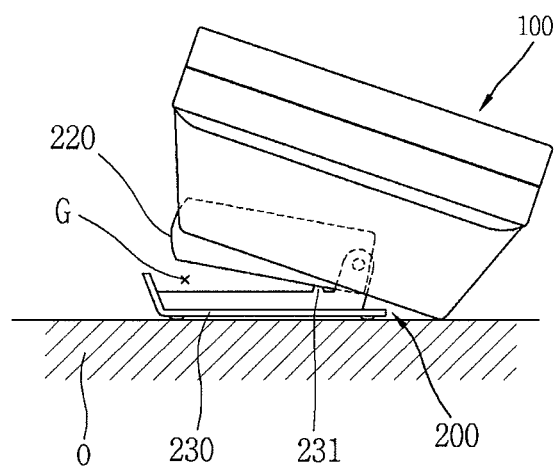
FIG. 10 illustrates a schematic view showing a cooperating relation between a door and a projector upon the door being open.

In yet another alternative embodiment, a spacer 231 may protrude from a surface of the door 230 facing the projector 220, as shown in FIG. 10. In general, when the door 230 is placed on the surface of the object O, gravity is applied to the projector 220 so as to rotate the projector 220 in a direction approaching the door 230. In this case, gravity may be used to replace the function of the cooperation units 260, 270, 270' and 280 described above. When gravity causes the projector 220 to approach the door 230, the spacer 231 restricts the movement of the projector 220. Accordingly, a gap G is ensured for an air flow between the projector 220 and the door 230.

Figure 11:
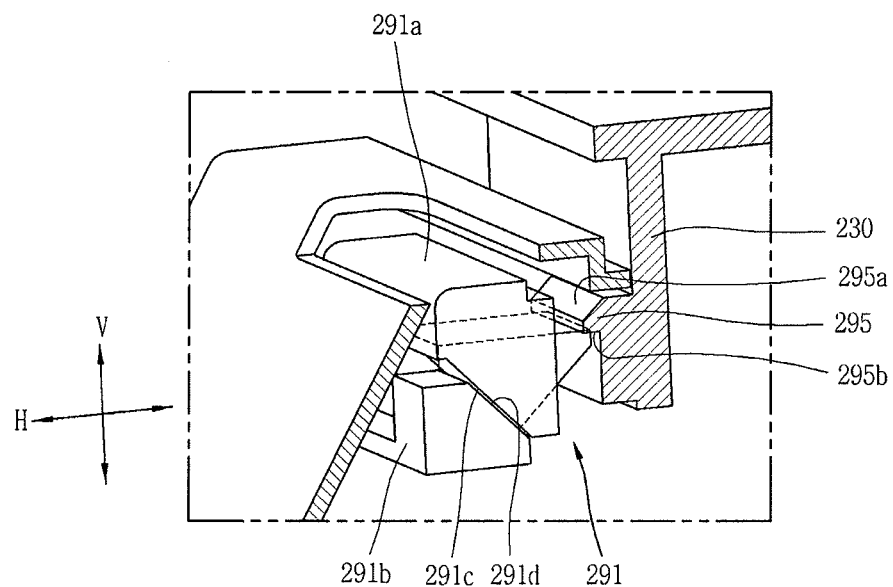
FIG. 11 illustrates a partial perspective view showing a locking unit of FIG. 6.

As shown in FIG. 11, the knob-latch assembly 291 may include a knob 291a disposed to be movable in a vertical direction V, and a latch 291b disposed to be movable in a horizontal direction H. The knob 291a and the latch 291b are elastically supported by elastic members in each motion direction. The knob 291a and the latch 291b may have inclination surfaces 291c and 291d, respectively. The inclination surfaces 291c and 291d have angles to provide alignment with each other. Accordingly, upon the knob 291a moving in the vertical direction V, the latch 291b moves in the horizontal direction H.

A portion of the knob 291a protruding toward the door 230 is engageable with a supporting portion 295 formed at the door 230. The supporting portion 295 may have an upper surface 295a and a lower surface 295b. As shown in FIG. 11, upon the knob 291a being pressed, the latch 291b is retreated from the door 230 to be separated from the upper surface 295a of the supporting portion 295. Accordingly, when the latch 291b is stopped at the lower surface 295b, the door 230 is kept open. In other words, the rotation in the closed state can be restricted by the engagement between the latch 291b and the lower surface 295b. In order to rotate the door 230 to be closed, the knob 291a can be manipulated such that the latch 291b is released from the above state to thusly be engaged with the upper surface 295a of the supporting portion 295.

Figure 12:
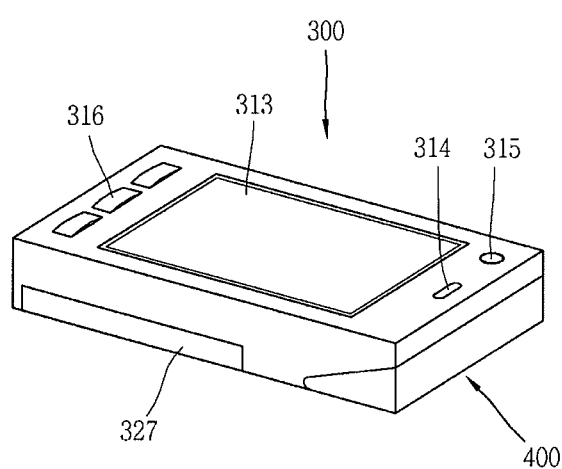
FIGS. 12 and 13 illustrate perspective views showing a portable terminal in accordance with another embodiment of the present invention.
Figure 13:
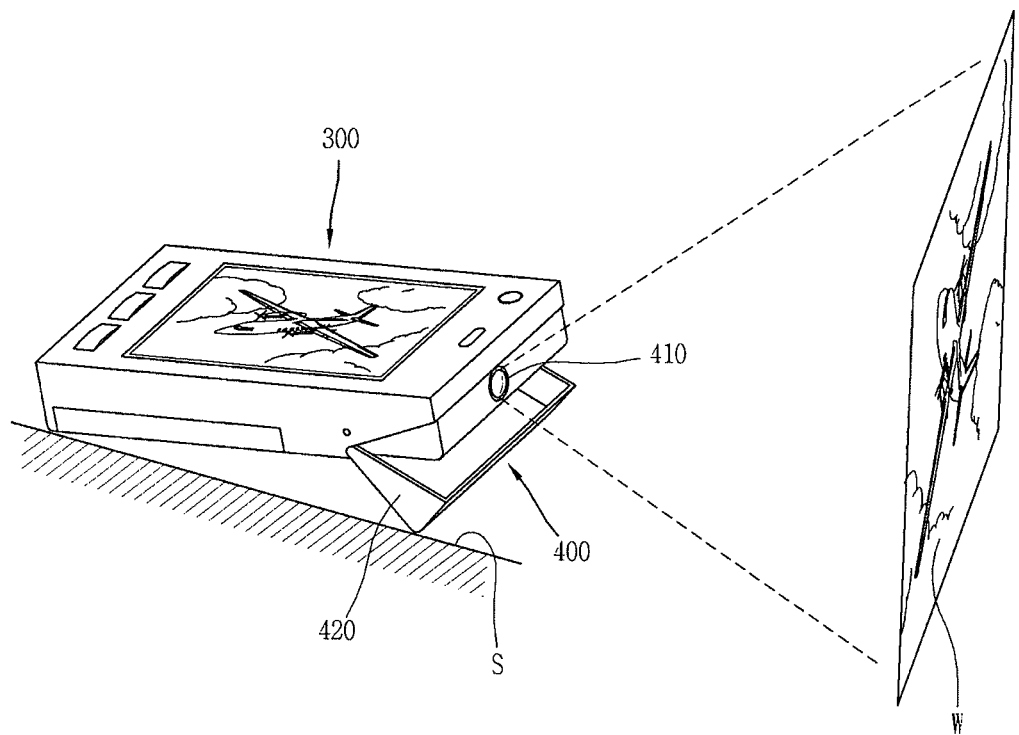

A portable terminal 300 in accordance with another embodiment of the present invention is shown in FIGS. 12 and 13. As shown in FIG. 12, a display 313, an audio output unit 314, a first image input 315, a first manipulation unit 316, and the like disposed at the main body of the portable terminal 300 are the similar to those described in previous embodiments; however, a projecting unit 400 is fixed to the main body of the portable terminal 300. The projecting unit 400 may be disposed at one end portion of the main body in a lengthwise direction of the main body. In particular, the projecting unit 400 may be disposed at a corner region where outer surfaces approximately perpendicular to each other meet.

As shown in FIG. 13, the projecting unit 400 may include a projector 410 coupled to the main body of the portable terminal 300 and a door 420 movably coupled to the main body. The portable terminal 300 may be arranged such that one surface having a lens of the projector 410 and another surface adjacent to the one surface can be exposed outwardly when the door 420 moves to an open position. In this open position, an exposed area of the projector 410 can be greatly increased.

The door 420 may be rotatably coupled to the main body by a hinge. When part of a door 420 is rotated and is supported on the surface S of an object, a part of the main body is also supported on the surface S and accordingly the portable terminal 300 can be placed thereon. With this positioning of the portable terminal, an image projected via the projector 410 may be output on a wall W located in front of the portable terminal 300 in a lengthwise direction thereof. A user can thus watch (see) the image and also the display 313 disposed at an angle with respect to the surface S.

A cam unit similar to the cam unit 250 (see FIG. 7) may be installed at the hinge portion of the door 420 to maintain the open state of the door 420. Even if a cam unit is not provided, if the door 420 is rotated past 90 degree, the door 420 will be supported on the surface S together with another part of the main body, thereby maintaining the open state.

Next, an operation method of the portable terminals 100 and 300 in accordance with the aforementioned embodiments will be described. While the description will be based upon the portable terminal 100, it is understood that such description will be applicable to the portable terminal 300 unless the configurations are different from each other.

Figure 14:
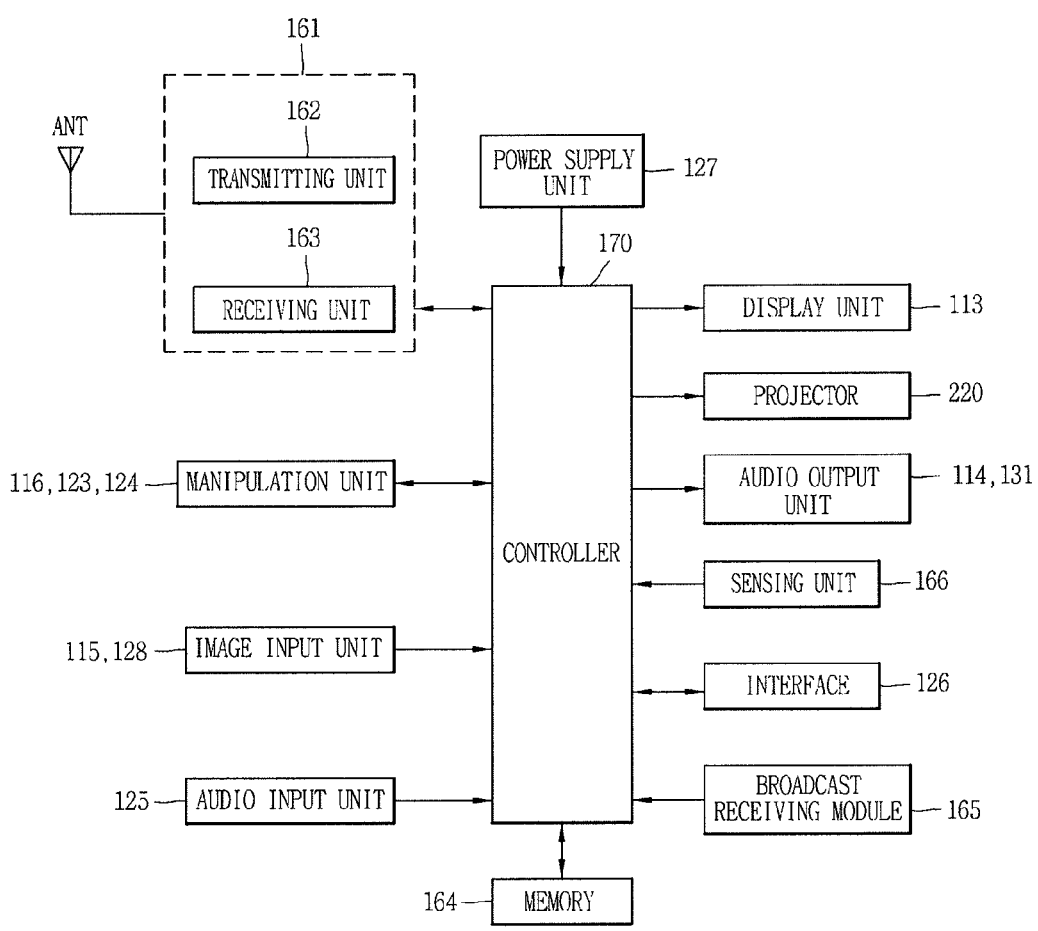
FIG. 14 illustrates a block diagram of a portable terminal according to the present invention.

As shown in FIG. 14, the portable terminal may include a wireless communication module 161, manipulation units 116, 123, and 124, image input units 115 and 128, an audio input unit 125, a display 113, audio output units 114 and 131, a sensing unit 166, an interface 126, a broadcast receiving module 165, a memory 164, a power supply 127 and a controller 170.

The controller 170 may control the overall operation of the portable terminal. For example, the controller 170 may perform related control and processing for a voice call communication, data communication, telephony communication, and the like. Also, the controller 170 may control operations of the portable terminal according to the present invention in addition to the typical control functions.

The wireless communication module 161 may transmit and receive radio signals with a mobile communication base station via an antenna. For example, the wireless communication module 161 manages transmission and reception of audio data, text data, video data, and control data under the control of the controller 170. To this end, the wireless communication module 161 may include a transmitting unit 162 for modulating and transmitting a signal to be sent, and a receiving unit 163 for demodulating a signal received.

The manipulation units 116, 123, 124 may be configured, as shown in FIG. 1, thus to provide the controller 170 with key input data input by a user to control the operations of the portable terminal.

The image input units 115 and 128 process image frames of still images or video obtained by an image sensor in a video call mode or a capturing mode. Such processed image frames are converted into image data displayable on the display 113 to be then output on the display 113. The image frames processed by the image input units 115 and 128 may be stored in the memory 164 under the control of the controller 170 or be transmitted via the wireless communication module 161.

The audio input unit 125 receives an external audio signal via a microphone while the portable terminal is in a particular mode, such as phone call mode, recording mode, and voice recognition mode. This audio signal is processed and converted into digital data. Such processed digital data is converted into a data format transmittable to a mobile communication base station via the wireless communication module 161 when the portable terminal is in the phone call mode, and then outputted to the wireless communication module 161. The processed digital data may be stored in the memory 164 in a recording mode.

The audio input unit 125 may include assorted noise removing algorithms to remove noise generated in the course of receiving the external audio signal.

The display 113 displays information processed in the portable terminal. For example, when the portable terminal is in a phone call mode, the display 113 displays User Interface (UI) or Graphic User Interface (GUI) related to the call under the control of the controller 170. The projector 220 can display either the same information as that output on the display 113 or different information therefrom.

The audio output units 114 and 131 may convert audio data received from the wireless communication module 161 or audio data stored in the memory 164 under the control of the controller 170 when the portable terminal is in the call-receiving mode, a phone call mode, a recording mode, a voice recognition mode, or a broadcast receiving mode. Such converted audio data is then outputted externally. The audio output units 114 and 131 also output an audio signal associated with a function (e.g., outputting a call receiving sound, a message receiving sound, or the like) performed by the portable terminal. Such audio output units 114 and 131 may include a speaker, a receiver, a buzzer, and the like.

The sensing unit 166 provides status measurements of various aspects of the portable terminal. For instance, the sensing unit 166 may detect an open/close status of the portable terminal, a change of position of the portable terminal or a component of the portable terminal, a presence or absence of user contact with the portable terminal and the like, thereby generating a sensing signal for controlling the operation of the portable terminal. For example, the sensing unit 166 senses the open or closed state of a slide type portable terminal, and outputs the sensed result to the controller 170 such that the operation of the portable terminal can be controlled. Other examples include the sensing unit 166 sensing the presence or absence of power provided by the power supply 127 and the presence or absence of a coupling or other connection between the interface 126 and an external device.

The interface 126 is often implemented to couple the portable terminal with external devices. Typical external devices include wired/wireless headphones, external chargers, wired/wireless data ports, card sockets (e.g., memory card, SIM/UIM card, or the like), and the like. The interface 126 may allow the portable terminal to receive data or power from external devices and transfer such data or power to each component inside the portable terminal, or transmit internal data of the portable terminal to external devices.

The memory 164 may store a program for the control and processing of the controller 170, or temporarily store input/output data (e.g., phone book data, messages, still images, video, or the like). Also, the memory 164 may store a program for controlling the operation of the portable terminal according to the present invention. The memory 164 may include a hard disk, a card-type memory (e.g., SD or XD memory), a flash memory, RAM, ROM, and the like.

The broadcast receiving module 165 may receive a broadcast signal transmitted via satellites or terrestrial waves and convert such broadcast signal into a broadcast data format capable of being output to the audio output units 114 and 131 and the display 113 so as to output the converted signal by the controller 170. The broadcast receiving module 165 may also receive additional data associated with broadcasting (e.g., Electric Program Guide (EPG), channel list, or the like). The broadcast data converted in the broadcast receiving module 165 and the additional data may be stored in the memory 164.

The power supply 127 (e.g., battery) provides power required by the various components for the portable terminal. The provided power may be internal power, external power, or combinations thereof.

Figure 15A:
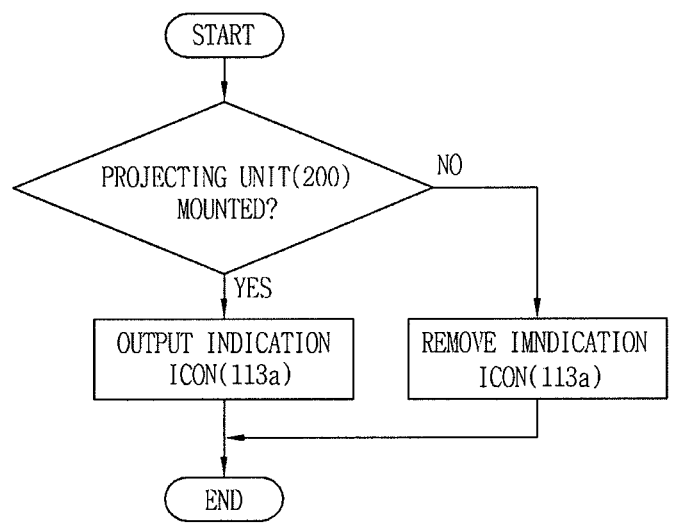
FIG. 15a illustrates a flowchart showing an exemplary operation of a portable terminal in cooperation with an attachment or detachment of a projecting unit.
Figure 15B:
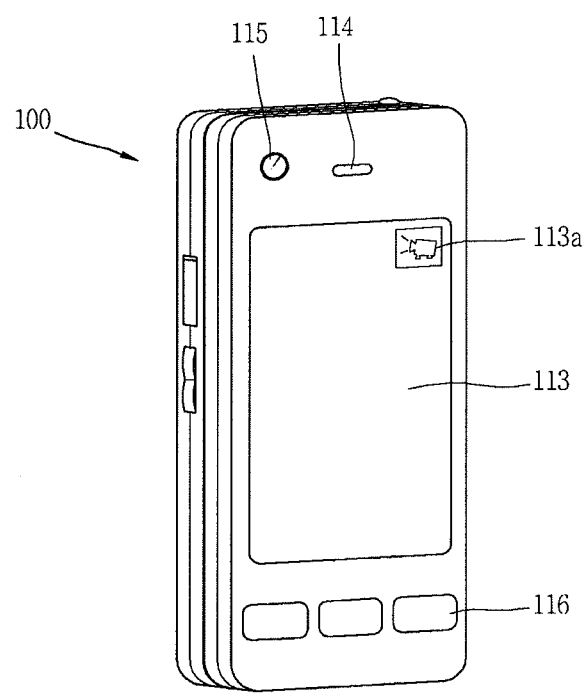

As shown in FIG. 15*a*, when the portable terminal 100 is turned on, the sensing unit 166 detects whether the projecting unit 200 is attached to the main body of the portable terminal 100. If the projecting unit 200 is detected as being attached, the results are provided to the controller 170. The controller 170 then outputs an icon 113*a* on the display 113 indicating the attachment of the projecting unit 200 according to the detection results (see also FIG. 15*b*). The icon 113*a* may be displayed as overlapping an image previously output on the display 113. Once the sensing unit 166 detects that the projecting unit 200 is not attached (e.g., detects the detachment of the projecting unit 200 from the main body), the controller 170 stops displaying the icon 113*a* output on the display 113.

By using the icon 113*a*, a user can easily recognize whether the projecting unit 200 has been attached to the main body of the portable terminal 100. While this embodiment has been described as using the icon 113*a*, it is understood that other manner of indicating the attachment of the projecting unit 200 may be used, such as using a light emitting element (e.g., light emitting diode (LED)) installed in a portion of the main body, which may be activated or deactivated so as to indicate the attachment or detachment of the projecting unit 200.

Figure 16A:
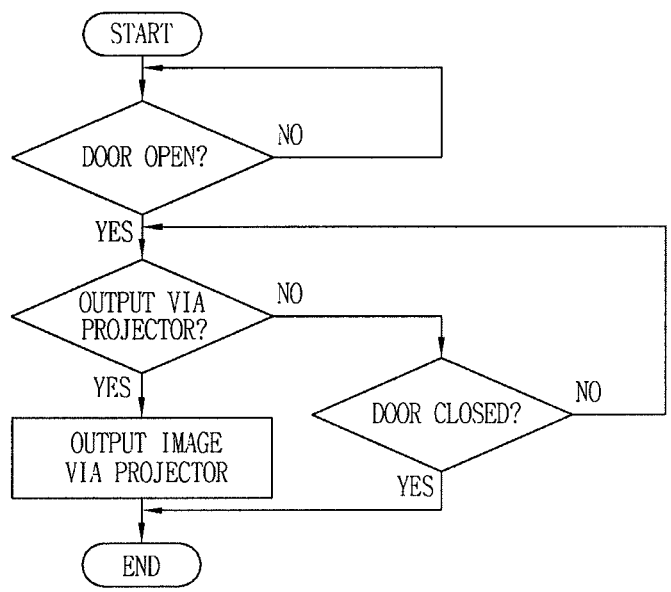
FIG. 16a illustrates a flowchart showing an exemplary operation for controlling a projector in cooperation with the opening of a door.
Figure 16B:
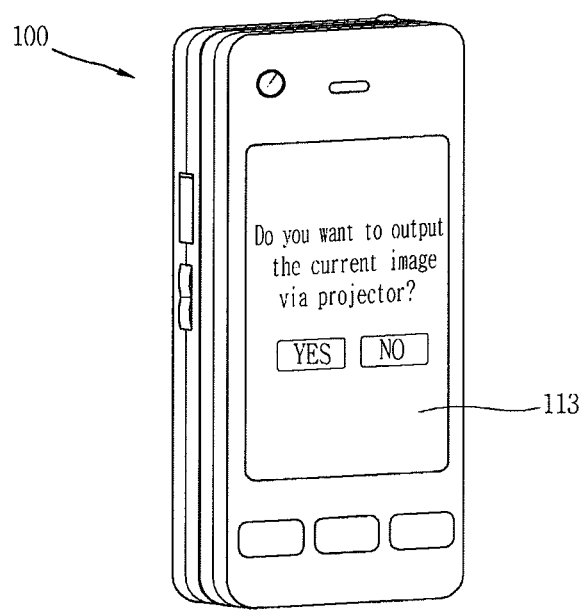

As shown in FIG. 16*a*, when the portable terminal 100 is turned on, the sensing unit 166 detects whether the door 230 is rotated into an open state. If the door 230 is detected as being open, the results are provided to the controller 170. Once the controller 170 has received indication that the door 230 is in an open step, the controller 170 performs a step of inquiring of a user as to whether to output an image via the projector 220. In particular, a screen may be output on the display 113 to inquire as to whether to output an image displayed on the display 113 by using the projector 220. A user can decide whether to output the image by touching the display 113. If the display 113 is configured without a touch sensor, the user can input the decision by manipulating the first manipulation unit 116.

If the user decides to output the current image by the projector 220, the projector 220 operates to project the image to the exterior. If the user decides not to output the current image by the projector 220, the controller 170 determines whether the door 230 has been converted into the closed state. If the door has been converted into the closed state, the controller 170 terminates the control operation relating to the open state of the door 230. If the door 230 has not been closed, the controller 170 may inquire again whether to output the image via the projector 220.

Alternatively, depending on setting information, the portable terminal 100 may be configured such that when the door 230 opens, an image is output via the projector 220 without inquiring whether to output the image via the projector 220.

Figure 17A:
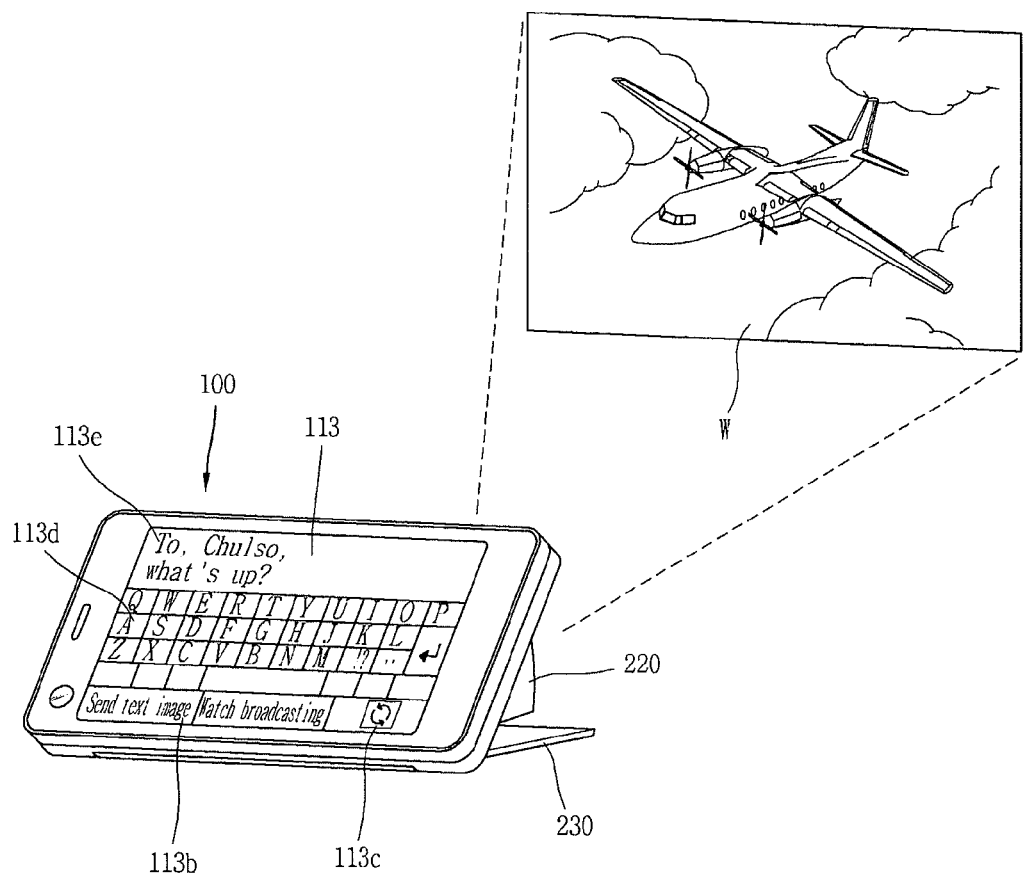
FIG. 17a illustrates a schematic view of an operation state of the portable terminal.

As shown in FIG. 17a, in the state of the portable terminal 100 being placed with the projection unit 200 in an open position, the projector 220 outputs first information onto the wall W. The first information may be other people on the wall W. The user can see the first information projected via the projector 220, and, additionally, watch or handle second information different from the first information on the display 113. For instance, the user can write a text message on the display 113 while watching a movie via the projector 220.

To this end, a display region 113b may be formed at one portion of the display 113. The display region 113b may display an indication related to the first information projected via the projector 220 and another indication related to the second information displayed on the rest region of the display 113. A conversion icon 113c output on the display region 113b may be employed to control the output conversion such that the display 113 can output the first information or the second information.

If a text message transmission is executed on the remaining region of the display other than the display region 113b of the display 113, the remaining region may include an input window 113d for displaying keys allowing a data or text input, such as Korean or English letters or words, and an output window 113e for outputting contents input by using the keys.

Figure 17B:
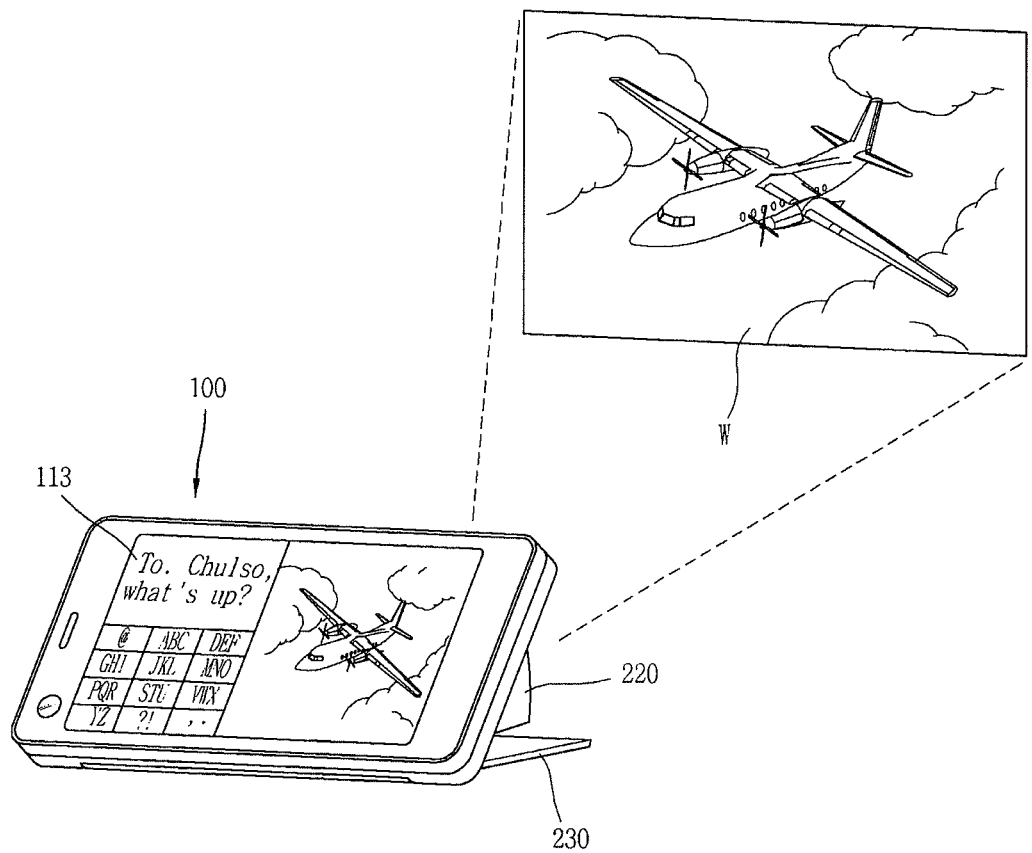

In yet another exemplary embodiment, as shown in FIG. 17b, the first information projected to the exterior via the projector 220 can be output on the display 113 along with the second information. To this end, the display 113 can simultaneously output the two types of information on divided screens.

A portable terminal having a projecting function according to the present invention can be implemented such that a projector is selectively exposed by a door, and accordingly, the projector can be protected from the exterior by the door when the door is closed.

The door is configured to form a surface intersecting the display when open, thereby allows the portable terminal to be placed with the display facing a user. Accordingly, the user can watch an image or video output via the projector in a comfortable position.

As mentioned above, because the projector is exposed outwardly with the door in the open state, an environment can be provided that is appropriate to dissipate heat generated in the projector.

The portable terminal having the projecting function may not be limited to the configuration and method described in the aforementioned embodiment, but many variations can be derived by selectively combining part or all of the embodiments. Such variations are not to be regarded as a departure from the spirit and scope of the invention, and all such modifications as would be obvious to one skilled in the art are intended to be included within the scope of the following claims.

What is claimed is:

1. A portable terminal comprising:
   a terminal body, the terminal body including an upper surface;
   a projector operatively connected to the terminal body, and rotatably attached to the terminal body such that the projector is movable between a first state and a second state with respect to the terminal body;
   a door movably mounted to the terminal body, the door being moveable between a first position covering the projector and a second position exposing the projector;
   a display disposed on the terminal body upper surface; and
   a spacer protruded from the door to maintain a gap between the door and the projector during the rotation of the projector,
   wherein the door is mounted at a surface opposite to the terminal body upper surface, and
   wherein, when the door is in the second position, a plane defined by a surface of the display is disposed to intersect a plane defined by a main surface of the door.

2. The portable terminal of claim 1, further comprising a maintenance unit to maintain the door in the second position, the maintenance unit connecting the door and the terminal body.

3. The portable terminal of claim 2, wherein the maintenance unit includes:
   a fixed portion connected to one of the door and the terminal body;
   a movable portion connected to the other of the door and the terminal body, the movable portion being configured to be engageable with the fixed portion; and
   an elastic member configured to press the movable portion toward the fixed portion such that the door is maintained in the second position.

4. The portable terminal of claim 3, wherein each of the fixed and movable portions has concave-convex patterns at surfaces thereof, the concave-convex patterns of the movable portion being engageable with the concave-convex patterns of the fixed portion to maintain the door in the second position when the moveable portion is pressed towards the fixed portion.

5. The portable terminal of claim 1, further comprising a cooperation unit connecting the projector and the door, the cooperation unit being configured such that the projector is placed in the second state when the door is moved to the second position, the projector having a different projection direction in the second state from a projection direction of the projector in the first state.

6. The portable terminal of claim 5, wherein, in the second state, a portion of the projector is spaced farther from the door than the portion of the projector is spaced from the door in the first state.

7. The portable terminal of claim 5, wherein the door and the projector are rotatably attached to the terminal body, and a door rotational angle is greater than a projector rotational angle when the door is moved to the second position.

8. The portable terminal of claim 7, wherein the cooperation unit includes a plurality of gears connecting the door to the projector, and at least two of the plurality of gears have different diameters.

9. The portable terminal of claim 7, wherein the cooperation unit includes:
   a slot formed at one of the projector and the door; and
   a link having one end rotatably connected to the other of the projector and the door, the link having another end slidably inserted into the slot.

10. The portable terminal of claim 1, wherein the door and the projector are rotatably attached to the terminal body, one of the door and the projector includes a protrusion extending from a surface thereof towards an opposing surface of the other of the door and the projector, and said opposing surface having a guide portion formed therein, the protrusion being slidably inserted in the guide portion.

11. The portable terminal of claim 1, further comprising a locking unit provided between the door and the terminal body, the locking unit being configured to lock the door in at least one of the first position and the second position.

12. The portable terminal of claim 11, wherein the locking unit includes:
   a knob provided at the terminal body, the knob being elastically movable in a first direction;
   a latch provided at the terminal body, the latch being elastically movable in a second direction in cooperation with the movement of the knob; and
   a supporting portion provided at the door, the supporting portion having a plurality of surfaces by which an end portion of the latch is supported.

13. The portable terminal of claim 12, wherein the first direction is substantially perpendicular to the second direction.

14. The portable terminal of claim 1, wherein at least one protrusion is provided at an outer surface of the door.

15. The portable terminal of claim 11, wherein the protrusion is either integrally protruded from the door or is a pad attached to the door, and the protrusion is formed of a material having a higher capability of absorbing vibration than the material of the door.

16. The portable terminal of claim 1, further comprising a speaker provided in a region where the door is disposed on the surface of the terminal body.

17. The portable terminal of claim 1, wherein the terminal body includes a display configured to either independently output second visible information different from first visible information or output both the first and second visible information while the projector outputs the first visible information.

18. The portable terminal of claim 1, further comprising:
   a maintenance unit to maintain the door in the second position, the maintenance unit connecting the door and the terminal body;
   a cooperation unit connecting the projector and the door, the cooperation unit being configured such that the projector is placed in the second state when the door is moved to the second position, the projector having a different projection direction in the second state from a projection direction of the projector in the first state; and
   a locking unit provided between the door and the terminal body, the locking unit being configured to lock the door in at least one of the first position and the second position.

19. The portable terminal of claim 1, wherein the terminal body includes:
   a first body having a display;
   a second body slidably coupled to the first body, the second body having a user input unit; and
   the portable terminal further comprising a projecting unit detachably mounted to the second body,
   wherein the projecting unit includes:
   the projector configured to output visible information;
   a housing configured to support the projector such that the projector is moveable between a first state and a second state, the housing being detachably coupled to the second body, and
   wherein the door is mounted to the housing.

20. The portable terminal of claim 19, further comprising a maintenance unit connecting the door and the housing, the maintenance unit being configured to maintain the door in the second position.

21. The portable terminal of claim 19, wherein the display is configured to be touch-sensitive to receive a touch input, and the user input unit is configured to be manipulated in a different manner from the touch input.

22. The portable terminal of claim 19, wherein the second body includes a coupling unit, the coupling unit being configured to connect one of a battery cover to cover an accommodation chamber for accommodating a battery and the housing of the projecting unit.

23. The portable terminal of claim 19, further comprising a cooperation unit connecting the projector and the door, the cooperation unit being configured such that the projector is placed in the second state when the door is moved to the second position, the projector having a different projection direction in the second state from a projection direction of the projector in the first state.

24. The portable terminal of claim 1, further comprising a sensing unit configured to detect the door in the first position and the second position, the sensing unit being provided at one of the terminal body and the door, and the projector being operable in a first state when the sensing unit detects the door in the second position.

25. The portable terminal of claim 24, further comprising a maintenance unit connecting the door and the housing, the maintenance unit being configured to maintain the door in the second position.

26. The portable terminal of claim 24, wherein the display is configured to either independently output second visible information, different from first visible information, or output both the first and second visible information while the projector outputs the first visible information.

27. The portable terminal of claim 26, wherein the first visible information and the second visible information are either displayed simultaneously on the display or displayed separately on the display by dividing a screen of the display.

28. The portable terminal of claim 27, wherein the terminal body includes a user input unit, and the first state of the projector is actuated by an input via the user input unit.

29. The portable terminal of claim 28, wherein the display is configured to be touch-sensitive, and the user input unit includes the display.

30. A mobile phone comprising:
   a terminal body, the terminal body including an upper surface;
   an image projector operatively connected to the terminal body, and rotatably attached to the terminal body such that the projector is movable between a first state and a second state with respect to the terminal body;
   a door movably mounted to the terminal body, the door being moveable between a first position covering the projector and a second position exposing the projector;
   a display disposed on the terminal body upper surface; and
   a spacer protruded from the door to maintain a gap between the door and the projector during the rotation of the projector,
   wherein the door is mounted at a surface opposite to the terminal body upper surface, and
   wherein, when the door is in the second position, a plane defined by a surface of the display is disposed to intersect a plane defined by a main surface of the door.

31. The mobile phone of claim 30, the terminal body includes:
   a first body having a display;
   a second body slidably coupled to the first body, the second body having a user input unit; and
   a projecting unit detachably mounted to the second body,
   wherein the projecting unit includes:
   the projector configured to output visible information; and a housing configured to support the projector such that the projector is moveable between the first state and the second state, the housing being detachably coupled to the second body.

32. A kit comprising:
a portable terminal including:
a terminal body including an upper surface;
a display on the upper surface;
a battery cover mountable to the terminal body to cover a battery compartment;
a projection unit detachably mountable to the terminal body in place of the battery cover,
wherein the projecting unit includes:
   a projector configured to output visible information;
   a housing configured to support the projector such that the projector is moveable between a first state and a second state, the housing being detachably coupled to the terminal body;
   a door mounted at an surface opposite to the terminal body upper surface; and
   a spacer protruded from the door to maintain a gap between the door and the projector during the rotation of the projector, and
   wherein, when the door is in the second position, a plane defined by a surface of the display is disposed to intersect a plane defined by a main surface of the door.

\* \* \* \* \*